Jan. 12, 1971 A. SCHWARZKOPF 3,554,822
PROCESS AND APPARATUS FOR MANUFACTURING BAGS OF PLASTICS
MATERIAL HAVING PRESSURE OR SLIDE FASTENER
STRIPS JOINED BY HEAT-SEALING
Filed May 19, 1967
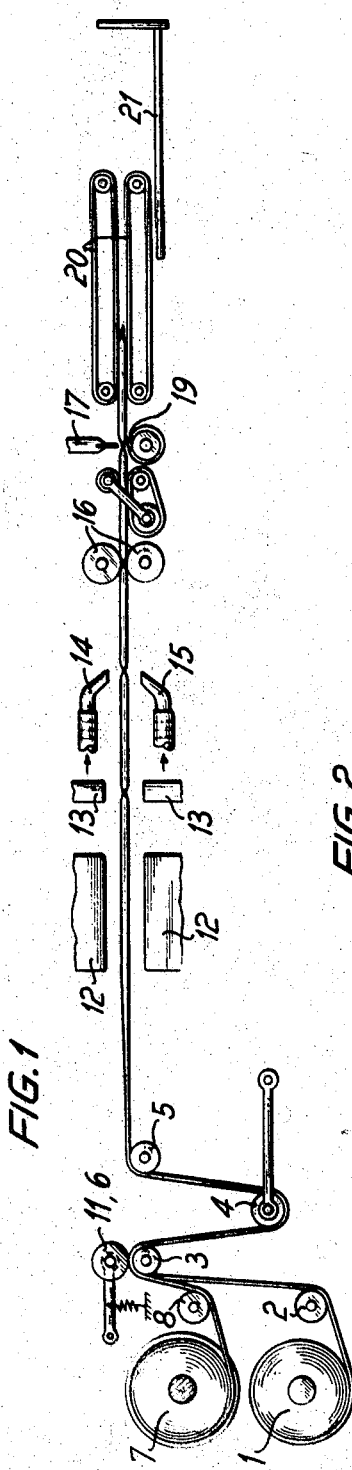
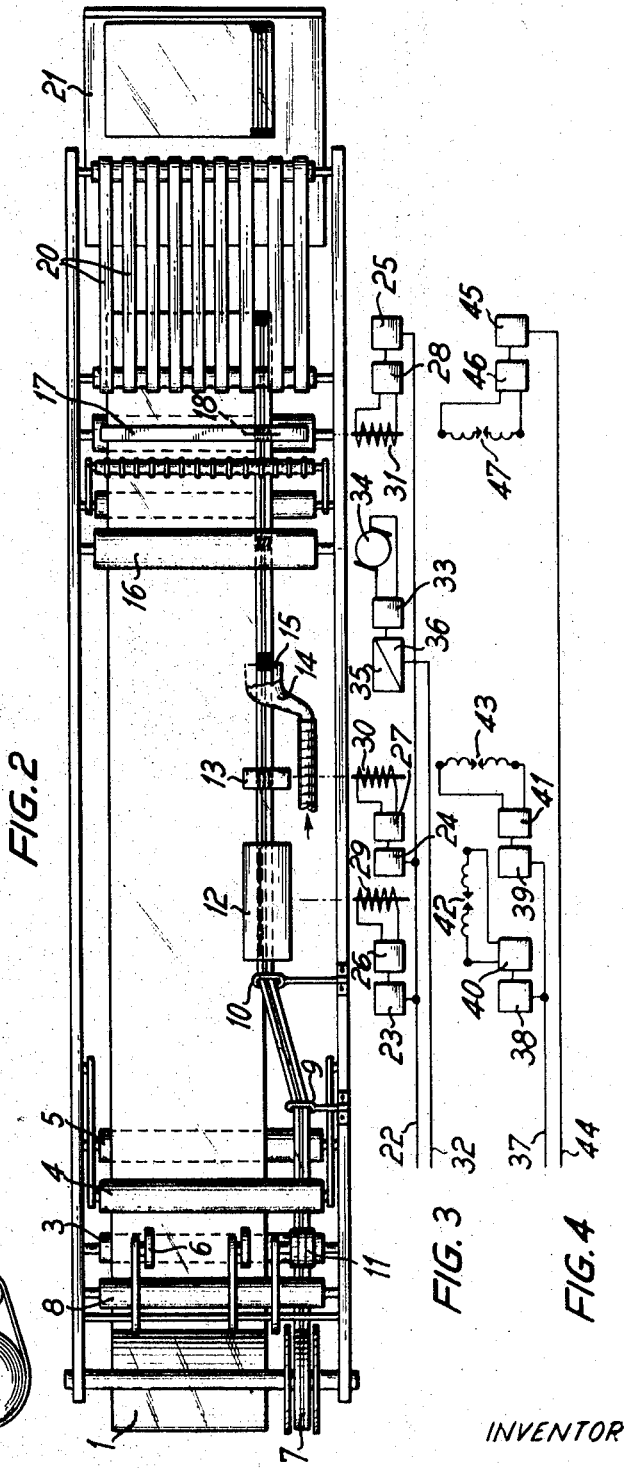
INVENTOR
August Schwarzkopf
Stevens, Davis, Miller & Mosher
Attorneys

United States Patent Office 3,554,822
Patented Jan. 12, 1971

3,554,822
PROCESS AND APPARATUS FOR MANUFACTURING BAGS OF PLASTICS MATERIALS HAVING PRESSURE OR SLIDE FASTENER STRIPS JOINED BY HEAT-SEALING
August Schwarzkopf, Lengerich of Westphalia, Germany, assignor to Windmoller & Holscher, Lengerich of Westphalia, Germany
Filed May 19, 1967, Ser. No. 639,711
Claims priority, application Germany, June 1, 1966, W 41,709
Int. Cl. B32b 31/10
U.S. Cl. 156—66     10 Claims

ABSTRACT OF THE DISCLOSURE

Intermittently fed fastener strips, which are hooked together, are introduced between the spread-apart edges of an intermittently advanced sheeting web, which has been laid to form two plies. The strips are heat-sealed to the sheeting web with the aid of pulse-heated heat-sealing jaws. In the manufacture of bags having pressure fasteners, at least one further advancing step is then performed and the fastener strips are subsequently joined together by heat-sealing in a second heat-sealing station with the aid of preferably pulse-heated heat-sealing jaws. One or more further advancing steps are performed and the sheeting web is thereafter subjected in a third heat-sealing station to a transverse severing and heat-sealing operation by a preferably continuously heated severing and heat-sealing tool, whereby individual bags are severed and closed. In the same station, the fastener strips are cut through their heat-sealed node. The timing of the closed position of the jaws and the timing of the heat-sealing pulses are controlled independently of each other. The timing of the heat-sealing pulses is controlled so that the heat-sealing pulses are terminated considerably before the heat-sealing jaws are opened.

---

For considerable time, bags having pressure and slide fasteneres have been known, in which the fastener is formed by fastener strips, which are heat-sealed each to an edge of the web and are hooked one into the other. For the manufacture of such bags, a process has been disclosed in which the fastener belts which have been moved one to the other and hooked one into the other are transversely heat-sealed at points spaced apart by the width of the mouth of the bag to be made. In this way, the strips are divided into sections in such a manner that one half of each heat-sealed seam joining the strips forms one end of a section. The automatic or semi-automatic devices used for this purpose generally permit of a preparation of a plurality of pairs of strips, which are arranged parallel to each other, in the manner described.

On the other hand, a bag-making machine is preferably used for making bottom seam bags or side seam bags in which the width of the mouth corresponds to the pressure fastener strip sections which have been made and separated in the other device. In a semi-automatic subsequent operation, the pressure fastener strip sections are manually applied to the bag body and are then heat-sealed to it in a semi-automatic operation.

A similar procedure is adopted in the manufacture of bags having slide fasteners, with the difference that the preliminary heat-sealing of the ends of the pairs of strips is omitted because the fastener slide must be inserted when the bag has been made and before the ends of the strips are closed by clipping or heat-sealing.

In another process which has been disclosed, the manufacture of bags having pressure fasteners is fully mechanized in that the pair of fastener strips are supplied to the bag-making machine and are laterally heat-sealed to the open side of a half-tubing of plastics material sheeting. In this case, the length of the lateral heat-sealing jaws is as large as or larger than the intended width of the desired bag section. The bag web and strip pair length are advanced before each heat-sealing cycle and are joined during each cycle. When the bag web has been provided with a pair of fastener strips, the bag web is subsequently subjected to a joint severing and heat-sealing operation in the transverse heat-sealing station. In the manufacture of bags having a pressure fastener, the transverse jaws are designed so that the area which includes the pair of fastener strips is heated to a higher temperature. In the manufacture of bags having a slide fastener, the strip is severed in this area without a joining of the strip parts by heat-sealing.

The process which has been described first hereinbefore has the disadvantage that the manufacture of the bags is not automatic but performed in a plurality of operations, which in part involve manual work. The fully mechanized process which has been described has the important disadvantages that an optimum matching and selection of the three heat-sealing operations which are required to join the strips to the web, to join the strips to each other, and to transversely sever and close the bag is not possible so that considerable difficulties have been encountered so far. More particularly, the joining of two fastener strips together in the transverse severing and heat-sealing station was inadequate in many cases. Difficulties arose in the manufacture of bags too what were shorter than the jaws for joining the strips to the web so that the continuously heated jaws caused a formation of overlapping heat-sealed seams and each cycle of the machine involved a renewed melting of the sheeting in an area which had previously been heat-sealed to the fastener strip.

It is an object of the present invention to provide a process and apparatus for the manufacture of bags having pressure and slide fasteners in such a manner that all heat-sealing and severing operations required in the manufacture of the bags can be optimally performed. At the same time, the output of the bag-making machine should be increased over that obtained in performing the previously known processes.

According to the invention, the process of manufacturing bags of plastics material having pressure or slide fastener strips joined by heat-sealing is performed in that the intermittently fed fastener strips, which have been hooked together, are introduced between the spread-apart edges of an intermittently advanced sheeting web which has been laid to form two plies. The strips are heat-sealed to the sheeting web in a first heat-sealing station having pulse-heated heat-sealing jaws. The manufacture of bags having pressure fasteners at least one further advancing step is performed and the fastener strips are subsequently joined by heat-sealing in a second heat-sealing station having preferably pulse-heated heat-sealing jaws. One or more further advancing steps are performed and the sheeting web is thereafter subjected in a third heat-sealing station to a transverse severing and heat-sealing operation by a preferably continuously heated severing and heat-sealing tool, whereby individual bags are severed and closed. The fastener strips are cut through their heat-sealed node in the same station, the timing of the closed position of the jaws and the timing of the heat-sealing pulses are controlled independently of each other. The timing of the heat-sealing pulses is controlled so that the heat-sealing pulses are terminated considerably before the heat-sealing jaws are opened. Because the required operations are performed in three heat-sealing stations, one of which is a special heat-sealing station for joining the fastener strips together, it is no longer necessary to make a compromise in matching the operations of the various parts of the apparatus, bearing in mind that such compromise will necessarily involve an inadequate performance of one or more steps. The joining of the strips together by heat-sealing in a separate heat-sealing station ensures, above all, that the strips may be joined together in a substantial width whereas this joint was previously made only at the extreme edges in conjunction with the transverse severing and heat-sealing operation. The use of pulse-heated heat-sealing tools at least in the station for joining the strip to the web ensures that the heat-sealed seam is cooled under pressure and the heat-sealed joint is protected from distortion to a high degree. The same remarks are generally applicable to the station where the strips are joined together. In this station, pulse-heated heat-sealing tools or tools which are highly similar to pulse-heated tools are employed. The fact that the timing of the heat-sealing and the timing of the closed position of the jaws are adjustable independently of each other to obtain optimum results ensures a fully automatic production with a minimum of trouble in operation.

In a development of the process according to the application, the heat-sealed nodes formed in the second heat-sealing station and joining the strips together are moved in the next advancing step into the range of a cooling device because the cooling of these relatively thick portions would otherwise take a prolonged time.

A fully automatic production with a minimum loss of time can be obtained according to the invention if the advance of the web and of the fastener strips is itnitiated by a signal which is generated in response to the opening of that set of heat-sealing jaws which opens last, and is terminated by a switching device which responds to the advance of a predetermined web length. The initiation of the advance upon the termination of the heat-sealing cycle ensures that there is no loss of time between the opening of the jaws which open last and the subsequent advance, regardless of the selected timing of the closed position of the jaws. It is also possible in this case to generate a new jaw-closing pulse when the advance is terminated so that there is no loss of time between the end of the advance and the next heat-sealing cycle.

An apparatus for carrying out the process according to the invention is characterized in that separate heat-sealing stations are provided for joining the fastener strips, which are hooked together, to a sheeting web laid to form two plies. For joining the fastener strips to each other, and for the transverse heat-sealing and severing operation to form individual bags, the station for joining the strips to the web and preferably also the station for joining the strips together have pulse-heated heat-sealing tools. The heating pulses and the timing of the closed position of the jaws are adjustable as desired at separate timers. The heat-sealing jaws of the station for joining the strips to the web may have the same length as the longest bags which can be made on the apparatus because the pulse heating does not involve disadvantages due to the fact that the fastener strips have been heat-sealed during the preceding heat-sealing cycle in the overlap areas.

The station for joining the strips to the web may preferably be preceded by a guiding eye, the outside surfaces of which spread the edges of the web apart and the opening of which guides the fastener strips which are hooked together, so that the feeding of the strips and the spreading apart of the edges of the sheeting are performed most simply. Between the station for joining the strips together and the advancing drive, which precedes the transverse severing and heat-sealing station, a cooling blower may be provided, which is preferably adjustable in the direction of travel of the web and by which the heat-sealed nodes joining the strips together are cooled, as mentioned hereinbefore, when the web has been advanced one step after the strips have been joined together. The adjustment in the direction of travel of the web serves for an adaptation to bags made on the apparatus and having mouths of different width. In the severing and heat-sealing station, a heating wedge may be provided adjacent to the sheeting web laid to form two plies, and an unheated severing knife may be provided adjacent to the fastener strips. As the fastener strips have been joined together in the separate station for joining the strips together, they need not be heated again adjacent to the transverse severing and heat-sealing station. More particularly, it is no longer required to provide for a heating of the heating element of the transverse severing and heat-sealing station to a higher temperature adjacent to the fastener strips so as to enable a severing of the much larger thickness of material adjacent to these strips. To ensure that these strips, which are much thicker, will be severed, the transverse heat-sealing and severing station according to the invention may comprise a back-pressure roller, which is provided with a heat-resisting, resilient covering and with a slot, which is preferably lined with sheet metal or the like and which receives the severing knife protruding beyond the heating wedge. This arrangement prevents the severing knife from damaging the resilient covering of the back-pressure roller and reliably ensures a complete cutting through the material adjacent to the fastener strips.

The invention will now be explained more fully with reference to the drawing, in which the apparatus according to the invention is diagrammatically shown. In the drawing FIG. 1 is a side elevation showing the various stations of a bag-making machine according to the invention, FIG. 2 is a top plan view showing the bag-making machine of FIG. 1, FIG. 3 is a circuit diagram of the device for controlling the means for closing the jaws in the heat-sealing stations and for controlling the advancing motor, and FIG. 4 is a circuit diagram of the means for controlling the heating of the heat-sealing jaws.

As is apparent from FIGS. 1 and 2, the half-tubing from which the bags are made is withdrawn from the supply roll 1 and around the deflecting roller 2, the driven follow-up roll 3, and the dancer roll 4 and over the deflecting roller 5 to the working stations. Pressure rollers 6 are provided on top of the follow-up roll 3 and ensure a positive movement of the half-tubing by the follow-up roll 3. The fastener strips have been hooked together before they were wound up on the supply roll 7 and are now moved to the working stations around the deflecting roller 8, the follow-up roll 3, around the dancer roll 4, and the deflecting roller 5 and through the guiding eyes 9 and 10. A pressure roller 11 is provided on top of the follow-up roller 3 and ensures that the strip will be withdrawn at the same rate as the sheeting web. If the fastener strips have been wound up on different supply rolls, a separate set of profiled rolls must be provided for hooking the strips together. The guiding eye 10 protrudes between the edges of the sheeting to hold the same somewhat apart and to move the fastener strips into the position for being joined to the web. The strips may be held in this position during the following heat-sealing operation by special guiding means, which are not shown here.

When the follow-up roll 3 and the advancing rolls 16 are standing still, the jaws 12 for joining the strips to the web close to join the heat-sealing lugs of the fastener strips to the sheeting. The jaws 13 for joining the strips together close at the same time to join the fastener strips together at a distance from the jaws 12 for joining the strips to the sheeting. The jaws 13 also join the strips to the longitudinally joined sheeting adjacent to the subsequently formed side seam.

After another advancing step of the sheeting web and the fastener strips joined thereto, the heat-sealed node which has just been formed in joining the strips together is moved into the range of the air nozzles 14, 15 so that the heat-sealed joint, which is still hot, is cooled. After one or more further advancing steps effected with the aid of the pair of advancing rolls 16, the heat-sealed node 16 joining the strips together assumes a centered position under the severing and heat-sealing tool of the severing and heat-sealing station 17.

During the closing of the jaws for heat-sealing the severed edges, the sheeting portion of the bag web, which has been provided with a pressure fastener strip, is heat-sealed and severed by means of a heated wedge. At the same time, a knife 18 extending across the width of the fastener strip, which is thicker than the sheeting, enters a slot 19 in the lower roll during the descent of the upper roll so that the strip is chopped off throughout its width. The line of cut is at the center of the heat-sealed joint previously formed in the station for joining the strips together. The completely heat-sealed bag is then engaged by the deliver conveyor belts 20 and moved to the delivery table 21.

In the first embodiment, the means for driving the various stations are controlled in accordance with FIG. 3 by a line 22 for transmitting a pulse for closing the jaws. The jaw-closing pulse initiates at the same time the operation of the timers for the heat-sealing stations, namely, the timer 23 for the station for joining the strips to the web, the timer 24 for joining the strips together, and the timer 25 for the severing and heat-sealing station. At the same time, the jaw-closing pulse operates the contactors 26, 27 and 28, which energizes the solenoid sets 29, 30 and 31 to initiate the closing of the respective jaws at the same time. Depending on the times for which the timers 23, 24 and 25 have been set, the various pairs of jaws are opened sooner or later.

When the last-opening pair of jaws have been held closed for the preset time, a signal is fed back to release the advancing pulse, which is transmitted over the advancing pulse line 32, and further jaw-closing pulses are blocked at the same time. When the advancing pulse has been released, the contactor 33 starts the advancing motor 34, which is not stopped until the relay-type photoelectric cell amplifier 35 or the relay-type travel-sensing amplifier 36 has delivered a signal causing the motor to stop. A feedback signal is generated at the same time as the stopping signal to release the next jaw-closing pulse.

In the embodiment shown in FIG. 4, the heating of the heat-sealing jaws in the station 12 for joining the strips to the web and the station 13 for joining the strips together is controlled by the heating pulse line 37 in simultaneous response to the appearance of the jaw-closing pulse. The timers 38 and 39 are released and the associated contactors 40 and 41 for the heating current supply heating current to the heating elements 42, 43. Depending on the times to which the timers have been preset, the latter terminate the heating pulse independently of the times for which the timers have been preset which control the closing of the jaws.

In the example which is shown, the severing and heat-sealing station is supplied with heating current via the heating line 44, the thermostat 45 and the switch 46 associated with the thermostat. When the jaw body 47 has reached the preset maximum temperature, a temperature feeler connected to the thermostatic switch effects a temporary interruption of the heating current, which is reestablished when the temperature has dropped to a lower limit.

What is claimed is:

1. A method of manufacturing bags of plastic material having pressure or slide fastener strips joined to the bags by heat-sealing, comprising the steps of:

intermittently feeding said fastener strips, which are hooked together, along a first predetermined path of travel;

intermittently moving a two-ply plastic web open at one side along a second predetermined path of travel adjacent said first path of travel; introducing said fastener strips between said two plies of said plastic web at the one side thereof;

heat-sealing said fastener strips to said plastic web adjacent the open side thereof by means of first pulse-heated heat-sealing means;

performing at least one advancing step of said plastic web, sealing said fastener strips to each other at distances corresponding to the desired bag width by means of second pulse-heated heat-sealing means;

performing at least one further advancing step;

heat-sealing and severing said plastic web transverse to the longitudinal direction thereof by third heat-sealing and severing means, so as to make individual bags and cut said fastener strips through their heat-sealed joint, the timing of the closed position of said pulse-heated heat-sealing means and the timing of the heating pulses being controlled independently of each other such that the heat-sealing pulses are terminated before said pulse-heated heat-sealing means are opened.

2. The method as defined in claim 1, wherein said heat-sealed joints formed by said second pulse-heated heat-sealing means are moved in the next advancing step into the range of a cooling device.

3. The method as defined in claim 1, wherein the advance of said plastic web and of said fastener strips is initiated by a signal which is generated in response to the opening of that set of said pulse-heated heat-sealing means which open last, and is terminated by a switching device which responds to the advance of the predetermined length of said plastic web.

4. The method as defined in claim 3, wherein a new closing pulse for said pulse-heated heat-sealing means is generated upon the termination of the advance.

5. Apparatus for manufacturing bags of plastic material having pressure or slide fasteners joined to the bags by heat-sealing comprising:

means for intermittently moving said fastener strips, which are hooked together, along a first predetermined path of travel and for intermittently moving a two ply plastic web open at one side along a second predetermined path travel adjacent said first path of travel;

means for introducing said fastener strips between said two plies of said plastic web;

first pulse-heated heat-sealing means for heat-sealing said fastener strips to said plastic web;

second pulse-heated heat-sealing means for heat-sealing said fastener strips to each other;

third heat-sealing and severing means working on said plastic web transverse to the longitudinal direction thereof so as to make individual bags;

means for cutting said fastener strips through their heat-sealed joint; and a plurality of timers adapted to control the timing of the closed position of said pulse-heated heat-sealing means and the timing of the heating pulses independently of each other.

6. Apparatus according to claim 5, wherein said first pulse-heated heat-sealing means have the same length as the longest bags which can be made on said apparatus.

7. Apparatus according to claim 5, wherein said introducing means comprises a guiding eye the outside surfaces of which spread the edges of said plastic web apart and the opening which guides said fastener strips.

8. Apparatus according to claim 5, further comprising a cooling blower provided between said second pulse-heated heat-sealing means and said intermittent moving means and adjustable in the direction of travel of said plastic web.

9. Apparatus according to claim 5, wherein said third heat-sealing and severing means comprises a heated wedge-shaped tool in the region of said plastic web and an unheated severing knife in the region of said fastener strips.

10. Apparatus according to claim 9, wherein said third heat-sealing and severing means further comprises a back-pressure roller provided with a heat-resisting, resilient covering and with a slot which is preferably lined with sheet metal or the like and which receives said severing knife protruding beyond said heated wedge-shaped tool.

References Cited

UNITED STATES PATENTS

| | | | |
|---|---|---|---|
| 2,665,467 | 1/1954 | Bosomworth et al. | 156—66 |
| 2,882,956 | 4/1959 | Weist | 53—39XR |
| 2,884,988 | 5/1959 | D'Angelo | 53—39XR |
| 3,202,559 | 8/1965 | Laguerre | 156—66 |
| 3,392,636 | 7/1968 | Lindley | 156—322X |

CARL D. QUARFORTH, Primary Examiner

S. HELLMAN, Assistant Examiner

U.S. Cl. X.R.

53—39; 156—522